US008347293B2

(12) United States Patent
Lango et al.

(10) Patent No.: US 8,347,293 B2
(45) Date of Patent: Jan. 1, 2013

(54) MUTUAL EXCLUSION DOMAINS TO PERFORM FILE SYSTEM PROCESSES ON STRIPES

(75) Inventors: Jason A. Lango, Mountain View, CA (US); Robert M. English, Menlo Park, CA (US); Yasuhiro Endo, San Jose, CA (US); Mehul S. Shah, Milpitas, CA (US); William P. McGovern, San Jose, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 1597 days.

(21) Appl. No.: 11/255,859

(22) Filed: Oct. 20, 2005

(65) Prior Publication Data

US 2007/0094529 A1    Apr. 26, 2007

(51) Int. Cl.
*G06F 9/46* (2006.01)
*G06F 17/30* (2006.01)

(52) U.S. Cl. ........................................ 718/102; 707/713

(58) Field of Classification Search .............. 707/8, 704, 707/713; 718/102
See application file for complete search history.

(56) References Cited

U.S. PATENT DOCUMENTS

| 4,333,144 A | 6/1982 | Whiteside et al. |
| 4,459,664 A | 7/1984 | Pottier et al. |
| 4,488,231 A | 12/1984 | Yu et al. |
| 4,494,188 A | 1/1985 | Nakane et al. |
| 4,742,447 A | 5/1988 | Duvall et al. |
| 4,745,450 A | 5/1988 | Duvall et al. |
| 4,785,392 A | 11/1988 | Maier et al. |
| 4,875,159 A | 10/1989 | Cary et al. |
| 4,914,583 A | 4/1990 | Weisshaar et al. |
| 5,043,873 A | 8/1991 | Muramatsu et al. |
| 5,253,359 A | 10/1993 | Spix et al. |
| 5,280,614 A | 1/1994 | Munroe et al. |
| 5,297,265 A | 3/1994 | Frank et al. |
| 5,307,483 A | 4/1994 | Knipfer et al. |
| 5,327,556 A | 7/1994 | Mohan et al. |
| 5,357,612 A | 10/1994 | Alaiwan |
| 5,454,095 A | 9/1995 | Kraemer et al. |
| 5,481,706 A | 1/1996 | Peek |
| 5,481,747 A | 1/1996 | Kametani |
| 5,483,641 A * | 1/1996 | Jones et al. ................... 710/3 |

(Continued)

FOREIGN PATENT DOCUMENTS

DE    69425658 T2    4/2001

(Continued)

OTHER PUBLICATIONS

Rajan et al., U.S. Appl. No. 09/828,271, Apr. 5, 2001.*

(Continued)

*Primary Examiner* — Meng An
*Assistant Examiner* — Brian Chew
(74) *Attorney, Agent, or Firm* — Blakely, Sokoloff, Taylor & Zafman LLP (57) ABSTRACT

Multiple domains are created for processes of a storage server. The processes are capable of execution on a plurality of processors in the storage server. The domains include a first domain, which includes multiple threads that can execute processes in the first domain in parallel, to service data access requests. A data set managed by the storage server is logically divided into multiple subsets, and each of the subsets is assigned to exactly one of the threads in the first domain, for processing of data access requests directed to the data set.

27 Claims, 9 Drawing Sheets

U.S. PATENT DOCUMENTS

| | | | |
|---|---|---|---|
| 5,502,840 | A | 3/1996 | Barton |
| 5,513,314 | A * | 4/1996 | Kandasamy et al. ............. 714/6 |
| 5,590,326 | A | 12/1996 | Manabe |
| 5,644,709 | A | 7/1997 | Austin |
| 5,790,851 | A | 8/1998 | Frank et al. |
| 5,815,727 | A | 9/1998 | Motomura |
| 5,826,081 | A | 10/1998 | Zolnowsky |
| 5,857,180 | A * | 1/1999 | Hallmark et al. ..................... 1/1 |
| 5,872,909 | A | 2/1999 | Wilner et al. |
| 5,894,555 | A | 4/1999 | Harada et al. |
| 5,931,938 | A | 8/1999 | Drogichen et al. |
| 5,940,828 | A | 8/1999 | Anaya et al. |
| 5,963,962 | A | 10/1999 | Hitz et al. |
| 6,105,053 | A | 8/2000 | Kimmel et al. |
| 6,151,618 | A | 11/2000 | Wahbe et al. |
| 6,269,390 | B1 | 7/2001 | Boland |
| 6,289,369 | B1 | 9/2001 | Sundaresan |
| 6,345,240 | B1 | 2/2002 | Havens |
| 6,366,945 | B1 | 4/2002 | Fong et al. |
| 6,378,066 | B1 * | 4/2002 | Lewis .......................... 712/236 |
| 6,434,631 | B1 | 8/2002 | Bruno et al. |
| 6,471,375 | B2 | 10/2002 | Kobayashi et al. |
| 6,502,122 | B1 | 12/2002 | Takeuchi |
| 6,546,546 | B1 | 4/2003 | Van Doorn |
| 6,604,123 | B1 | 8/2003 | Bruno et al. |
| 6,622,155 | B1 | 9/2003 | Haddon et al. |
| 6,658,449 | B1 | 12/2003 | Brenner et al. |
| 6,662,252 | B1 * | 12/2003 | Marshall et al. ............. 710/200 |
| 6,691,166 | B1 | 2/2004 | Gasior et al. |
| 6,714,960 | B1 | 3/2004 | Bitar et al. |
| 6,728,959 | B1 | 4/2004 | Merkey |
| 6,745,222 | B1 | 6/2004 | Jones et al. |
| 6,779,182 | B1 | 8/2004 | Zolnowsky |
| 6,801,943 | B1 | 10/2004 | Pavan et al. |
| 6,850,947 | B1 * | 2/2005 | Chung et al. .................. 707/101 |
| 7,178,137 | B1 * | 2/2007 | Peak et al. ..................... 717/131 |
| 7,213,247 | B1 | 5/2007 | Wilner et al. |
| 7,290,260 | B2 | 10/2007 | Miller |
| 7,337,442 | B2 | 2/2008 | VoBa et al. |
| 7,404,067 | B2 * | 7/2008 | Aamodt et al. ............... 712/219 |
| 7,694,302 | B1 * | 4/2010 | Rajan et al. ................... 718/104 |
| 2001/0036181 | A1 | 11/2001 | Rogers |
| 2001/0037408 | A1 | 11/2001 | Thrift et al. |
| 2001/0037450 | A1 | 11/2001 | Metlitski et al. |
| 2001/0042139 | A1 | 11/2001 | Jeffords et al. |
| 2002/0026342 | A1 | 2/2002 | Lane et al. |
| 2002/0078119 | A1 * | 6/2002 | Brenner et al. ............... 709/102 |
| 2002/0091748 | A1 | 7/2002 | Rehg et al. |
| 2004/0117531 | A1 | 6/2004 | McKenney |
| 2005/0172293 | A1 * | 8/2005 | Petruncola et al. ........... 718/105 |

FOREIGN PATENT DOCUMENTS

| | | |
|---|---|---|
| EP | 145889 A2 | 6/1985 |
| EP | 0702815 B1 | 8/2000 |
| JP | 2001167060 A | 6/2001 |
| WO | WO 94/29807 A1 | 12/1994 |
| WO | WO 02/12839 A2 | 2/2002 |

OTHER PUBLICATIONS

Jin Xiong et al: "Design and performance of the dawning cluster file system" Cluster Computing, 2003. Proceedings. 2003 IEEE International Conference on Dec. 1-4, 2003, Piscataway, NJ, USA, IEEE, Dec. 1, 2003, pp. 232-239.

Joukov N et al. "Increased distributed storage survivability with a stackable raid-like file system" Cluster Computing and the Grid, 2005. CCGRID 2005. IEEE International Symposium on Cardiff, Wales, UK May 9-12, 2005, Piscataway, NJ, USA, IEEE, May 9, 2005, pp. 82-89.

"IA-32 Intel Architecture Software Developer's Manual, vol. 3: System Programming Guide," 2004, 26 pgs., Intel Corporation.

Michael A. Malcolm; A Process Abstraction and its Application; Department of Computer Science; University of Waterloo; Waterloo, Ontario; Proc. Eighth Manitoba Conference on Numerical Math. and Computing, 1978; pp. 33-50.

Dianne E. Britton and Mark E. Stickel; An Interprocess Communication Facility for Distributed Applications; RCE Laboratories; David Sarnoff Research Center; Princeton, New Jersey; IEEE 1980; pp. 590-595.

David R. Cheriton; Multi-Process Structuring and the Thoth Operating System; Development of Computer Science; University of British Columbia, Vancouver, B.C. Canada; Mar. 1979, pp. 1-64.

Keith A. Lantz et al.; Rochester's Intelligent Gateway; IEEE; Oct. 1982.

Slashdot: Tux2: The Filesystem That Would Be King—Microsoft Internet Explorer. Oct. 20, 2000.

Anita K. Jones et al.; StarOS, a Multiprocessor Operating System for the Support of Task Forces; Department of Computer Science Carnegie-Mellon University, Pittsburg, Pennsylvania; 1979.

Bruce Nelson and Yu-Ping Cheng; The Myth of Transfer Rate—How and Why SCSI Is Better than IPI for NFS; Technical Report 6, Second Edition—Auspex; Jul. 1992.

David R. Cheriton; The Thoth System: Multi-Process Structuring and Portablility; Operating and Programming Systems Series; The Computer Science Library.

David R. Cheriton et al.; Thoth, A Portable Real-Time Operating System; vol. 22; Feb. 1979; pp. 105-115. Operations Systems, Communications of the ACM, University of Waterloo.

Feitelson, Dror G. et al., "Parallel Job Scheduling: Issues and Approaches," Lecture Notes in Computer Science, vol. 949, Proceedings of the Workshop on Job Scheduling Strategies for Parallel Processing, 1995, pp. 1-18.

Powell Michael L. et al., "Process Migration in DEMOS/MP," ACM SIGOPS Operating Systems Review, vol. 17, No. 5, Oct. 1983, pp. 110-119.

* cited by examiner

MUTUAL EXCLUSION DOMAINS TO PERFORM FILE SYSTEM PROCESSES ON STRIPES

FIELD OF THE INVENTION

At least one embodiment of the present invention pertains to network storage systems, and more particularly, to a method and apparatus for increasing throughput in a storage server.

BACKGROUND

Figure 1:
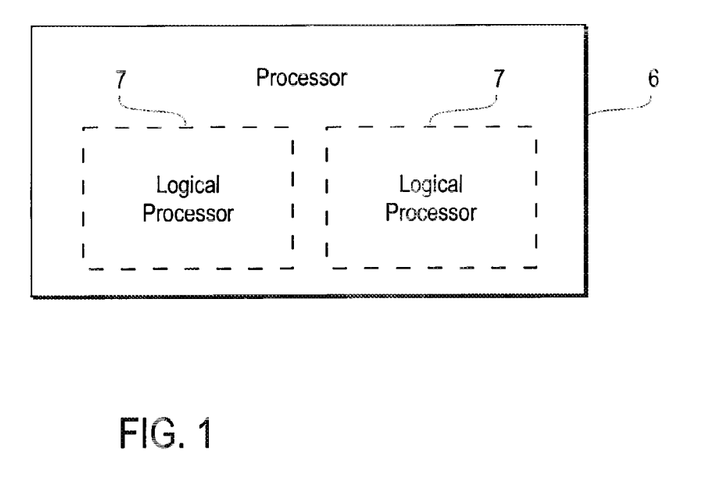
FIG. 1 illustrates a physical processor that includes multiple logical processors.

Multi-processor computing systems are becoming increasingly more common in a variety of applications. A multi-processor system is one which includes multiple processors, where the processors can be physical processors, logical processors, or a combination thereof. A single physical processor can implement multiple logical processors, as illustrated in FIG. 1, in which one physical processor 6 includes two logical processors 7. In such an implementation, the logical processors generally have some private state, but a portion of the state is shared. Henceforth in this document, the term "processor" is intended to mean either a physical processor or a logical processor unless the term is otherwise qualified.

To ensure that instructions and data are safe for execution in a multi-processor environment, the various processes implemented by the operating system can be organized into a number of mutual exclusion domains according to their functionality. A "domain", in this context, is a grouping of processes. Every process capable of execution by the processing device is assigned to exactly one domain. The domains are defined according to functionality, so that it is not possible for two processes in different domains to operate on the same data simultaneously. Furthermore, only one process at a time can execute in each domain (with a few exceptions for operations that are inherently multi-processor safe). Further details of a technique for defining and using domains in this manner are described in co-pending U.S. patent application Ser. No. 09/828,271 of V. Rajan et al, filed on Apr. 5, 2001 and entitled, "Symmetric Multi-Processor Synchronization using Migrating Scheduling Domains ("Rajan"), and U.S. patent application Ser. No. 09/828,284 of C. Peak et al., filed on Apr. 5, 2001 and entitled, "Automatic Verification of Scheduling Domain Consistency" ("Peak"), both of which are incorporated herein by reference.

The above-mentioned technique can be implemented in a storage server, such as one of the various models of Filer made by Network Appliance, Inc. (NetApp®) of Sunnyvale, Calif. The domains can be organized according to the critical path pipeline of the storage server. For example, when a storage server receives a data access request (read or write) from a client over a network, a network software layer of the storage server sends an appropriate message to the storage server's file system, which processes the message to determine where the corresponding data is stored, and which then forwards a corresponding message to a storage software layer (e.g., RAID layer) of the storage server. Each of these phases of processing the request is carried out by a different stage in the pipeline; as such, a separate domain can be created for each stage, e.g., a domain for all network-specific processes of the storage server, a domain for all file system-related processes of the storage server, a domain for all storage-specific processes of the storage server, etc.

It has been observed in certain storage servers that the different pipeline stages (and, hence, the corresponding domains) tend to have different degrees of processor utilization. For example, the file system related domain tends to have much higher processor utilization (close to 100 percent in certain implementations) than the network and storage domains (typically in the range of 20 to 50 percent). The file system domain, therefore, tends to be a bottleneck in the critical path of the storage server, thus limiting the throughput of the storage server.

SUMMARY OF THE INVENTION

The present invention includes a method in which a plurality of domains are created for processes that are executable on a plurality of processors in a processing device. The plurality of domains include a first domain which includes a plurality of threads that can execute processes in the first domain in parallel to service requests. A data set managed by the processing device is logically divided into a plurality of subsets, and each of the subsets of the data set is assigned to exactly one of the plurality of threads in the first domain, for processing of requests related to the data set.

The invention further includes an apparatus and system to perform such a method. In certain embodiments, the method is implemented in a data storage server.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A method and apparatus for increasing throughput in a storage server are described. References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

To solve the problems noted above, it is desirable to parallelize certain file system operations, such as read and writes. However, this must be done so as not to allow two or more potentially conflicting processes to operate on the same data at the same time. As described further below, embodiments of the invention accomplish this.

In certain embodiments of the invention, multiple mutual exclusion domains are created to group processes of the storage server, such that it is not allowed for two processes in different domains to operate on the same data at the same time. For most domains, only one process at a time can execute in a given domain, with exceptions noted below.

The domains include two domains for file system related processes. These two domains are mutually exclusive; i.e., no process in one of these domains is permitted to execute while any process in the other domain is executing, and vice versa.

The first file system related domain, named "FS-Exempt" in this description, includes multiple threads that can execute processes of the FS-Exempt domain in parallel, to service data access requests (e.g., reads and writes) and certain other operations. To prevent potentially conflicting operations from operating on the same data at the same time, each file (or other type of data container) stored by the storage server is logically divided into multiple sequential subsets, called "stripes", and each stripe is assigned to exactly one of the threads in the FS-Exempt domain, for purposes of processing operations directed to that data set. A "stripe" is a set of logically sequential data offsets in a set of data such as a file (or a LUN, or any other type of data container). Only the particular thread to which a stripe is assigned can operate on that stripe in the FS-Exempt domain. A given stripe is never assigned to more than one thread at a time in the FS-Exempt domain.

The other file system related domain, named "FS-Main" in this description, includes all file system related processes other than those in the FS-Exempt domain, and also includes certain other processes of the storage server. Unlike the FS-Exempt domain, the FS-Main domain is not parallelized into multiple threads; hence, only one process is permitted to execute at a time in the FS-Main domain. In certain instances, an operation may be initially assigned to the FS-Exempt domain and then subsequently reassigned to the FS-Main domain, such as if it would require fewer resources to do so.

The technique introduced here effectively allows a select set of file system operations to run in parallel, without having to make the majority of the file system code multiprocessor-safe, and without the need for frequent, low-level synchronization operations. The technique effectively stripes requests across processors in such a way as to: (a) spread file operation compute load across processors; (b) introduce implicit synchronization by limited sharing of data structures, reducing or eliminating the need for explicit locking of buffers and auxiliary data structures; and (c) facilitate easier memory and processor affinity on multiprocessor systems using, for example, non-uniform memory access (NUMA) or traditional memory bus cache-memory hierarchies.

Figure 2:
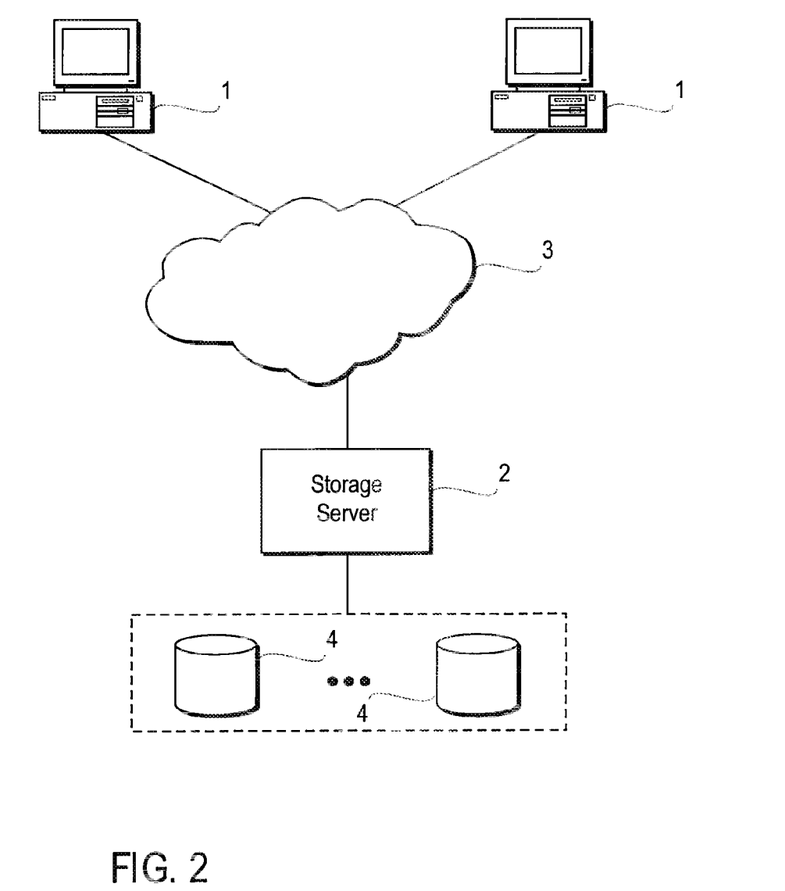
FIG. 2 illustrates a network environment that includes a storage server and clients.

FIG. 2 illustrates an example of a network environment in which this technique can be implemented. Although the example of FIG. 2 is a networked storage system, it will be understood that the invention can also be implemented in any of various other types of environments, e.g., not necessarily in a storage system. The system of FIG. 2 includes a storage server 2 coupled locally to a set of mass storage devices 4, and to a set of clients 1 through an interconnect 3. A technique for increasing efficiency and throughput in accordance with the invention can be implemented in the storage server 2.

The storage server 2 receives various read and write requests from the clients 1 and accesses the mass storage devices 4 to service those requests. Each of the clients 1 may be, for example, a conventional personal computer (PC), workstation, or the like. The mass storage devices 4 may be, for example, conventional magnetic tapes or disks, optical disks such as CD-ROM or DVD based storage, magneto-optical (MO) storage, or any other type of non-volatile storage devices suitable for storing large quantities of data, or a combination thereof. The mass storage devices 4 may be organized into one or more volumes of Redundant Array of Independent Disks (RAID).

The storage server 2 may be, for example, a file server, or "filer", such as may be used in a network attached storage (NAS) environment. Alternatively, the storage server may provide clients with block-level access to stored data, such as in a storage area network (SAN) environment. Or, the storage server 2 may be capable of operating in both modes. The storage server 2 can implement one or more of various different protocols, such as common Internet file system (CIFS), network file system (NFS), hypertext transport protocol (HTTP), simple network management protocol (SNMP), transfer control protocol/Internet protocol (TCP/IP), etc., and can selectively use these protocols as needed.

In a NAS implementation, the interconnect 3 may be essentially any type of computer network, such as a local area network (LAN), a wide area network (WAN), metropolitan area network (MAN) or the Internet, and may implement the Internet Protocol (IP). In a SAN implementation, the interconnect 3 may be, for example, a Fibre Channel switching fabric which implements the Fibre Channel Protocol (FCP).

Figure 3:
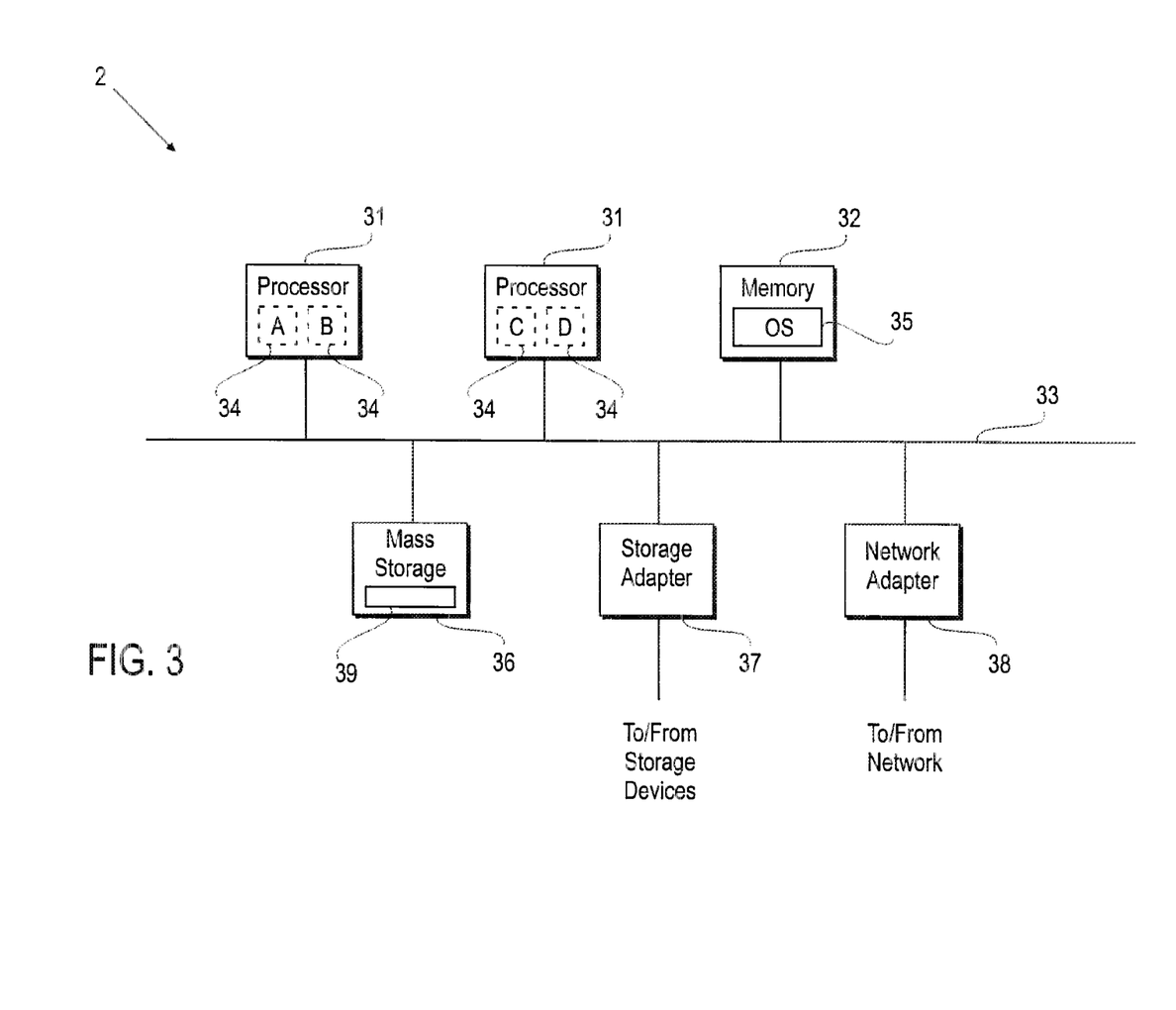
FIG. 3 is a block diagram of a storage server.

FIG. 3 is a high-level block diagram of the storage server 2 of FIG. 2, according to embodiments of the invention. Certain standard and well-known components which are not germane to the present invention are not shown. The storage server 2 in the illustrated embodiment is a multi-processor system, in that it includes two physical processors 31 coupled to a bus system 33. Each of the physical processors 31 implements two logical processors 34. One physical processor 31 includes logical processors A and B, while the other physical processor includes logical processors C and D. Note that in other embodiments the storage server 2 may include a number of physical processors other than two, and/or each physical processor may include a number of logical processors other than two.

The bus system 33 is an abstraction that represents any one or more separate physical buses and/or point-to-point connections, connected by appropriate bridges, adapters and/or controllers. The bus system 33, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The physical processors 31 are the central processing units (CPUs) of the storage server 2 and, thus, control the overall operation of the storage server 2. In certain embodiments, the physical processors 31 accomplish this by executing software stored in memory 32. A physical processor 31 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The storage server 2 also includes memory 32 coupled to the bus system 43. The memory 32 represents any form of random access memory (RAM), read-only memory (ROM), flash memory, or a combination thereof. Memory 32 stores, among other things, the operating system 35 of the storage server 2, in which the techniques introduced here can be implemented.

Also connected to the processors 31 through the bus system 33 are a mass storage device 36, a storage adapter 37, and a network adapter 38. Mass storage device 36 may be or include any conventional medium for storing large quantities of data in a non-volatile manner, such as one or more disks. The storage adapter 37 allows the storage server 2 to access the external mass storage devices 4 and may be, for example, a Fibre Channel adapter or a SCSI adapter. The network adapter 38 provides the storage server 2 with the ability to communicate with remote devices such as the clients 1 over a network and may be, for example, an Ethernet adapter or a Fibre Channel adapter.

Memory 32 and mass storage device 36 store software instructions and/or data 35 and 39, which may include instructions and/or data used to implement the techniques introduced here. These instructions and/or data may be implemented as part of the operating system 35 of the storage server 2.

Figure 4:
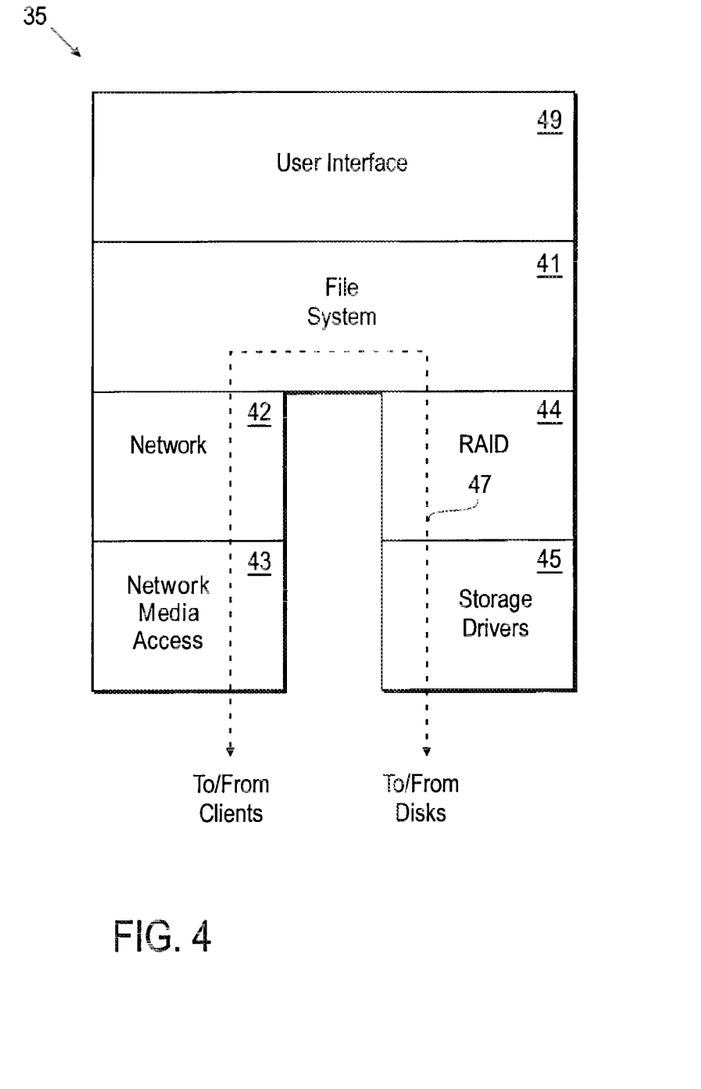
FIG. 4 illustrates the operating system of a storage server.

A shown in FIG. 4, the operating system 35 of the storage server 2 includes several modules, or layers. These layers include a file system 41. The file system 41 is an application-level programmatic entity which imposes a structure (e.g. hierarchical) on files, directories and/or other data containers stored and/or managed by a storage server, and which services read/write requests from clients of the storage server. An example of such a file system is the Write Anywhere File Layout (WAFL®) file system, which is part of the Data ONTAP™ operating system used in NetApp® Filers.

Logically under the file system 41, the operating system 35 also includes a network layer 42 and an associated network media access layer 43, to allow the storage server to communicate over a network (e.g., with clients 1). The network 42 layer implements various protocols, such as NFS, CIFS, HTTP, SNMP, and TCP/IP. The network media access layer 43 includes one or more drivers which implement one or more protocols to communicate over the network 3, such as Ethernet or Fibre Channel. Also logically under the file system 41, the operating system 35 includes a RAID layer 44 and an associated storage driver layer 45, to allow the storage server 2 to communicate with external mass storage devices 4. The RAID layer 44 implements a RAID protocol, such as RAID-4 or RAID-5, while the storage driver layer 45 implements a lower-level storage device access protocol, such as Fibre Channel or SCSI.

The operating system 35 may also include a user interface layer 49, which implements a graphical user interface (GUI) and/or a command line interface (CLI), for example, such as for purposes of administrative access to the storage server 2.

Figure 5:
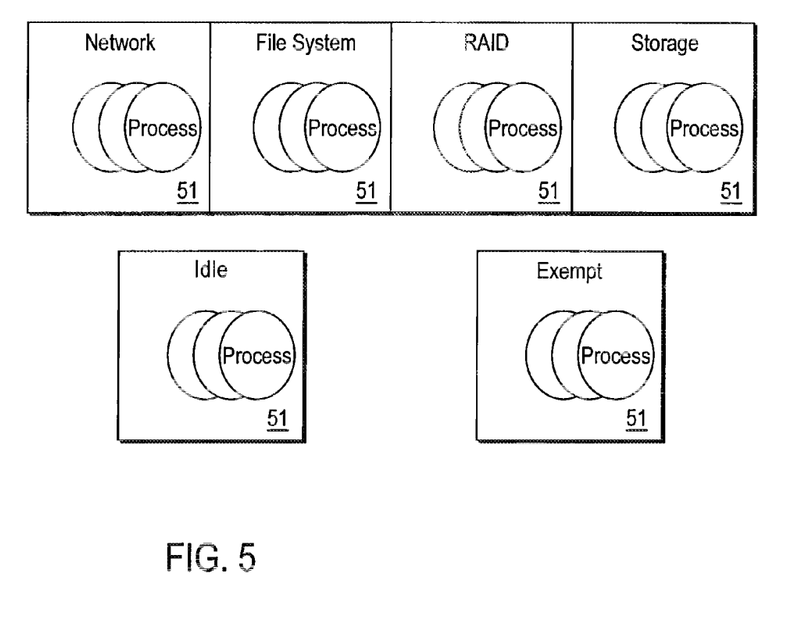
FIG. 5 shows multiple domains that may be implemented in a storage server.

To ensure that instructions and data are safe for execution in the multi-processor environment of the storage server 2, the operating system 35 can implement very coarse-grained symmetric multiprocessing (CSMP) instead of fine-grained symmetric multiprocessing found on some other systems, typically implemented by explicit locking mechanisms. Hence, the operating system 35 can be organized into a number of mutual exclusion domains 51 according to their functionality, as shown in FIG. 5. A "domain", in this context, is a grouping of processes. Every process capable of execution by the storage server 2 is assigned to one specific domain 51. The domains 51 are defined according to functionality so that it is not permitted for two processes in different domains to operate on the same data simultaneously. Furthermore, only one process at a time can execute in each domain 51, with certain exceptions noted herein.

As illustrated in FIG. 5, the following domains 51 can be implemented in the storage server 2: Network, File System, RAID, Storage, Idle and Exempt. The Network, File System, RAID, and Storage domains form the critical path of the pipeline for processing client requests. The Network domain includes all network-specific processes of the storage server 2. The Storage domain includes all storage-specific processes of the storage server 2. The RAID domain includes all RAID-specific processes of the storage server 2. The File System domain includes file system processes and all other processes that do not belong to another domain based on their functionality. A scheduler algorithm in the operating system 35 allows only one process to execute at a time in each domain 51, with two exceptions: the Idle domain and the Exempt Domain. The Idle domain is the domain within which a processor executes the idle loop. Idle threads from multiple processors may execute simultaneously in the Idle domain. The Exempt domain includes certain processes that are inherently multi-processor safe because they only operate on their input data (such as RAID XOR computations, compression/decompression, etc.), i.e., there is no global sharing of state.

Figure 6:
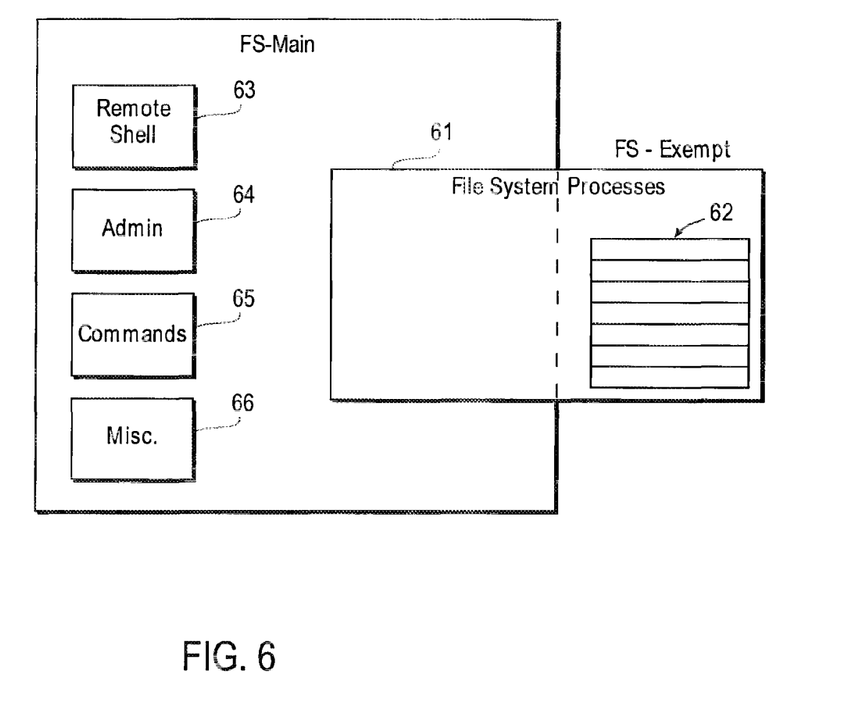
FIG. 6 shows a relationship between the FS-Main domain, the FS-Exempt domain and the file system.

According to embodiments of the invention, this technique can be modified as shown in FIG. 6, to provide better efficiency and throughput in the storage server 2. Specifically, the File System domain of FIG. 5 is replaced by a combination of two domains, called FS-Main and FS-Exempt. Hence, there are now two domains which contain file system related processes 61: FS-Exempt and FS-Main. These two domains are mutually exclusive; i.e., no process in FS-Exempt is permitted to execute while any process in FS-Main is executing, and vice versa.

The FS-Exempt domain includes multiple threads 62 that can execute processes of the FS-Exempt domain in parallel, to service data access requests (e.g., reads and writes) and certain other operations. In this regard the FS-Exempt domain is similar to the Exempt domain described above, however, unlike the Exempt domain, the FS-Exempt domain is mutually exclusive with the FS-Main domain.

To prevent potentially conflicting operations from operating on the same data at the same time in the FS-Exempt domain, each file (or other type of data container) managed or stored by the storage server is logically divided into multiple subsets, called "stripes", and each stripe is assigned to exactly one of the threads 62 in the FS-Exempt domain, for purposes of processing requests related to that data set. For a given stripe, every FS-Exempt operation will be processed by the same FS-Exempt thread. Each of the threads 62 in the FS-Exempt domain is uniquely identified within the operating system 35, however, the threads 62 are otherwise interchangeable. Hence, the FS-Exempt domain is essentially a thread pool. Only the thread to which a stripe is assigned can operate on that stripe in the FS-Exempt domain. In certain embodiments of the invention, the assignments of a stripe to a FS-Exempt thread 62 can be changed dynamically. However, a given stripe is never assigned to more than one thread at a time in the FS-Exempt domain. Hence, while threads 62 can operate in parallel in the FS-Exempt domain, no two threads 62 can perform conflicting operations in parallel.

As shown in FIG. 6, the FS-Main domain includes all file system related processes other than those in the FS-Exempt domain, and includes certain other processes of the storage server, such as remote shell processes 63, processes 64 for administrative access to the file system, processes 65 to implement various commands, and other processes 66. Unlike the FS-Exempt domain, the FS-Main domain is not parallelized into multiple threads; hence, only one thread is permitted to execute at a time in the FS-Main domain.

If necessary, any of the-threads in the FS-Exempt domain can explicitly synchronize operations, such as by acquiring locks, serializing, etc. In certain instances, an operation may be initially assigned to the FS-Exempt domain and then subsequently reassigned to the FS-Main domain, such as if processing indicates it would be less "expensive" to do so from a resource utilization standpoint. For example, an operation that appears suspicious in terms of potentially conflicting with another thread can be sent to FS-Main at any time before the affected data is actually modified in the storage server's internal memory.

Figure 7:
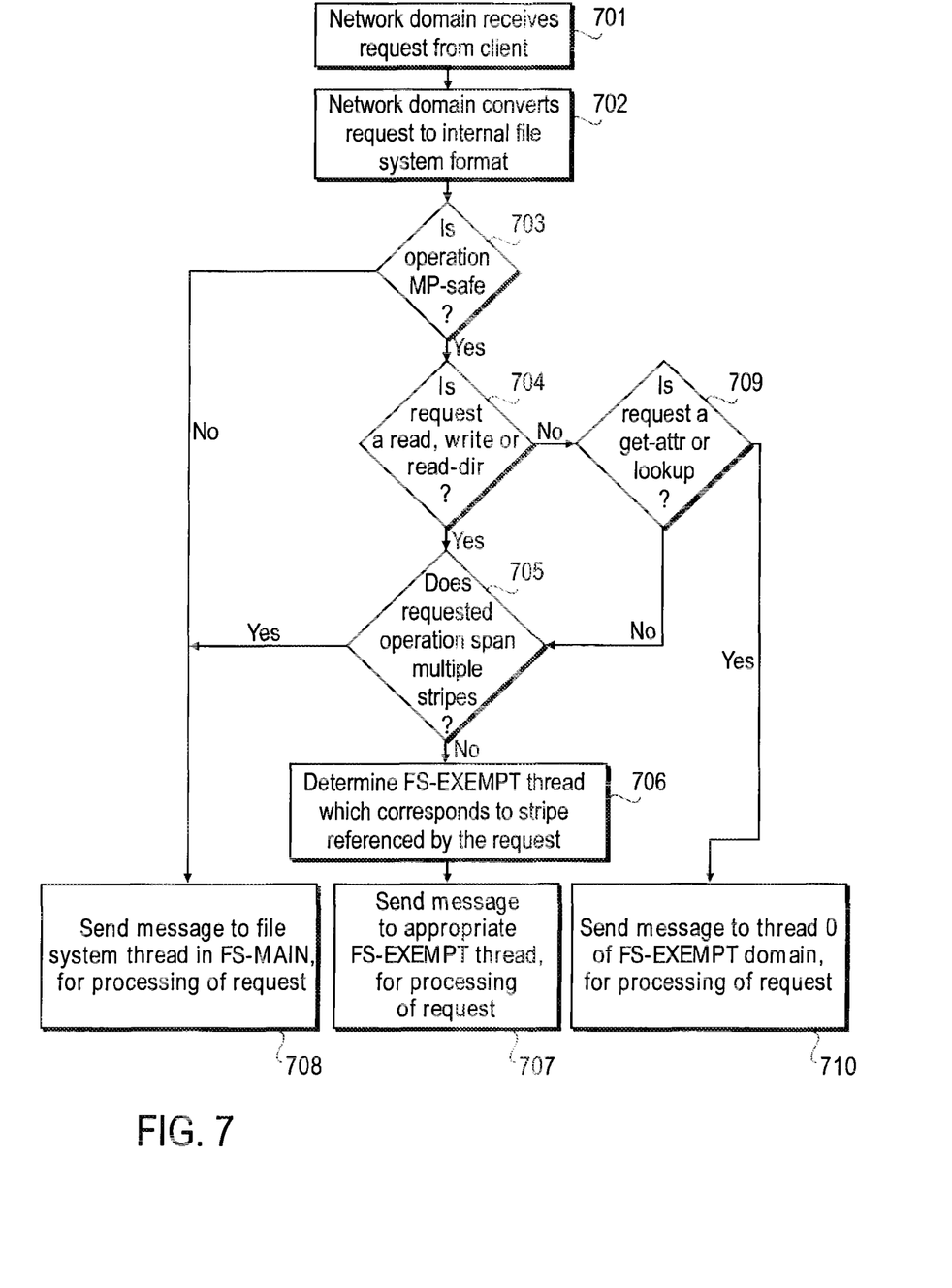
FIG. 7 illustrates portions of a routine performed by the operating system of a storage server in processing a request.

To further illustrate how the FS-Exempt domain and FS-Main domain can operate, FIG. 7 illustrates relevant portions of a routine that can be performed by the operating system 35 in processing a request, according to an embodiment of the invention. At 701, when a client transmits a request (which may be an NFS request, but not necessarily), to the storage server 2, initially the Network domain in the storage server 2 receives the request. At 702 the Network domain converts the request to an internal format recognized by the file system 41. The Network domain then determines at 703 whether the requested operation is multiprocessor-safe ("MP-safe"), i.e., an operation which is permitted to run on a FS-Exempt thread. In general, the operating system 35 is preconfigured to know which operations these include. These operations may include, for example, reads and writes.

If the requested operation is not MP-safe, the process proceeds to 708, in which a message is sent to an appropriate file system thread within the FS-Main domain, to trigger further processing of the request. The specific type of thread and the nature of the further processing depend upon the nature of the request and are not germane to the present invention.

If the operation is MP-safe, then the process instead proceeds from 703 to 704. At 704, if the requested operation is identified as a read, write or read directory ("read-dir") request, then the process proceeds to 705. At 705 a determination is made of whether the requested operation spans multiple stripes of the target file. If the requested operation spans multiple stripes, then parallel processing in the FS-Exempt domain is not appropriate; in that case, the process branches to 708, in which a message is sent to an appropriate file system thread in the FS-Main domain, to trigger further processing of the request.

Referring back to 704, if the requested operation is not a read, write or read-dir, then the process branches to 709, in which it is determined whether the requested operation is a data attribute ("get-attr") request or a lookup request. If the request is either of these two types, then the process proceeds to 710, in which a message is sent to a predetermined thread in the FS-Exempt domain, e.g., thread-0, to trigger further processing of the request. Thread-0 is used here as an example of a predetermined thread that corresponds to the first stripe in the file, where it is assumed the file's metadata is stored. However, any other FS-Exempt thread could be assigned for this purpose. If the requested operation is not a get-attr request or a lookup request at 709, the process proceeds to 705, described above.

Referring again to 705, if the requested operation does not span multiple stripes (i.e., the operation affects only a single stripe), then the process proceeds to 706. At 706, it is determined which FS-Exempt thread corresponds to the stripe referenced by the request (the "target stripe"). Any suitable algorithm may be used to map the target stripe to the correct thread. For example, a round-robin approach can be used, where the thread is identified by hashing the file ID of the file being accessed and {the target stripe—modulo-the number of FS-Exempt threads}. Once the correct FS-Exempt thread is identified, a message is then sent to that thread at 707 to trigger further processing of the request.

Figure 8:
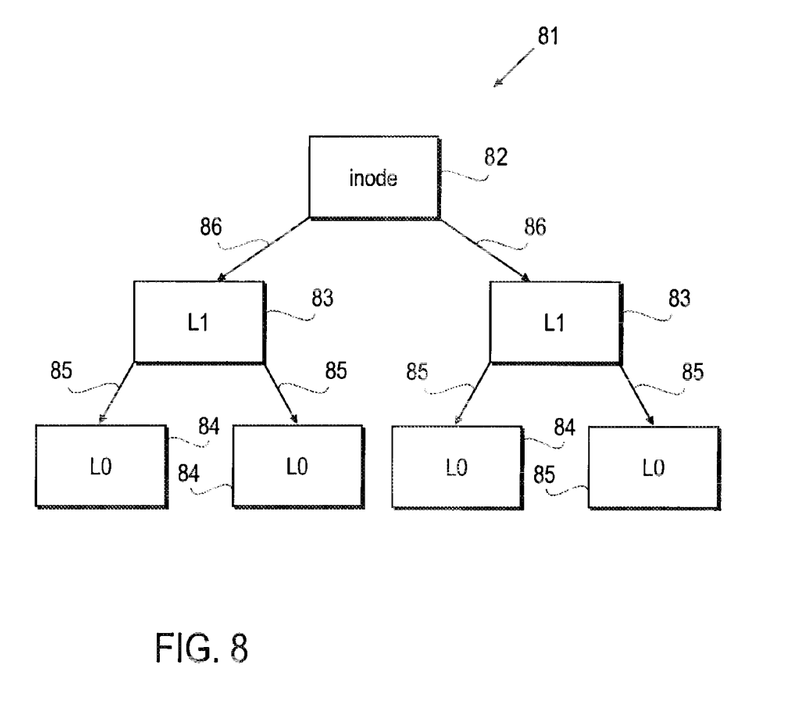
FIG. 8 illustrates a buffer tree of a file.

The size of file stripes can be arbitrary to some extent. However, certain factors should be considered in this regard. Assume, for example, that the file system 41 locates and store files (or other data units) through the use of buffer trees. A simple example of a buffer tree of a file is illustrated in FIG. 8. In this context, a buffer tree is a hierarchical structure (e.g., an N-ary tree) used by the file system 41 to keep track of the locations of the data blocks of a file. The root 82 of the buffer tree 81 is the inode of the file. The inode is a metadata structure which is used to store metadata about the file, such as file ownership, access permissions for the file, the size of the file, the file type, and pointers to locate the data blocks of the file. The buffer tree 81 includes one or more levels of indirect blocks 83, respectively called "Level-1 (L1) blocks", "Level-2 (L2) blocks", etc. The top level of indirect blocks 83 is pointed to by pointers 86 in the inode 82. Each indirect block 83 contains one or more pointers 85 to lower-level indirect blocks or to direct blocks 84 ("Level 0 (L0) blocks") of the file. The direct (L0) blocks 84 are the blocks which contain the actual data of the file (not just pointers or metadata).

Assuming the above buffer tree approach is used, the minimum stripe size of a file (or other data container) should be sufficient to load direct blocks in parallel and avoid cross-stripe accesses most of the time. Stripes only apply to direct (L0) blocks. A given FS-Exempt thread always operates on the same direct blocks (albeit from multiple files), and no two FS-Exempt threads share-direct blocks buffers. For large files, FS-Exempt threads may share the indirect blocks (L1 blocks, L2 blocks, etc.) and inode in the buffer tree, with careful read-mostly access. The stripe size is made equal to the address range of an L1 block, so that no two L1 blocks will be shared by two FS-Exempt threads. Note, however, that in alternative embodiments, the stripe size may be different.

This description thus far has generally assumed that the mapping of stripes to FS-Exempt threads is fixed. However, in alternative embodiments, stripes can be assigned to threads dynamically, based on any suitable criteria, such as efficiency, load balancing, etc. For example, it may be desirable to allow dynamic thread assignment in situations where the workload does not distribute data fairly across the threads or where the operations themselves are highly variable, such that some threads may have periods of heavy utilization while others have periods of light utilization.

Figure 9:
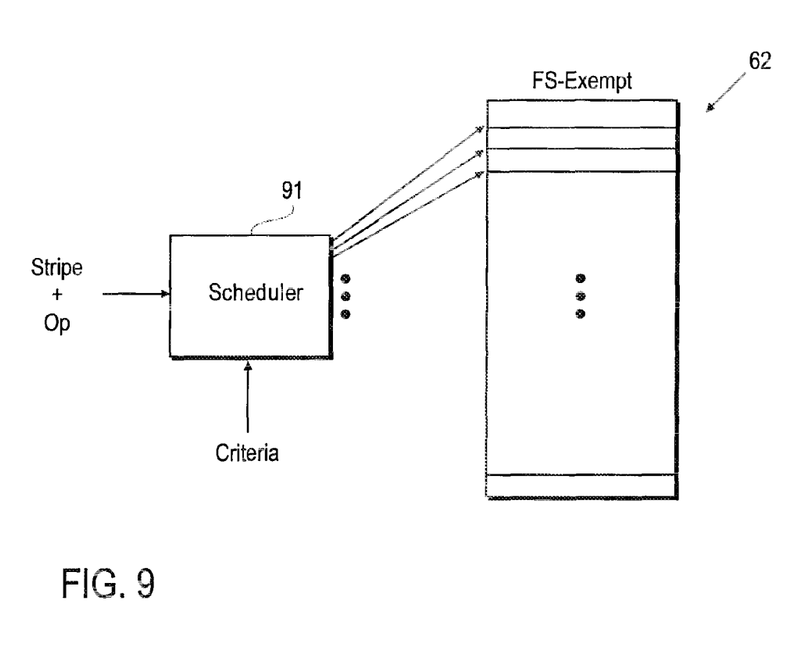
FIG. 9 shows a scheduler used to dynamically assign stripes to FS-Exempt threads.

In such an embodiment, as shown in FIG. 9, the operating system 35 may include a scheduler 91 that dynamically assigns stripes to appropriate FS-Exempt threads 62, based upon one or more appropriate criteria, while still ensuring that no stripe is assigned to more than one FS-Exempt thread at a time. Hence, a particular stripe may be assigned to one FS-Exempt thread in response to a first request and to a different FS-Exempt thread in response to a second request.

Various modifications and extensions can be made to the foregoing process without departing from the basic technique. An example of such an extension will now be described in relation to servicing a "read directory" ("read-dir") request.

As background for this example, assume that directory data is organized in blocks containing names and entries which map names to their associated file ids. Entries are marked "allocated" or "free". When allocating a directory entry, the directory is scanned for the first free entry and space for file name storage, which are then allocated. When freeing a directory entry, the entry is marked free and the corresponding name storage is deallocated. There is no explicit control over which entries are freed, and therefore directory blocks may become sparsely populated. For example, a sequence of REMOVE operations from a client can result in directory blocks full of free entries. A subsequent read-dir operation might need to skip multiple blocks of free entries in order to return a set of allocated filenames to the client.

Assume further that a read-dir request specifies a starting offset and a number of directory entries to read (as in the case of an NFS READ-DIR request). Hence, in response to a read-dir request, the operation is first sent to the FS-Exempt thread which owns the first offset covered by the read-dir operation. If the read-dir operation must span multiple file stripes, such as if the directory is relatively sparse (e.g., due to fragmentation), the operation can be suspended and restarted on the FS-Exempt thread which owns the next file stripe. This approach works at least where the read-dir proceeds linearly through the directory and the operation does not need to be atomic. In this way, certain cross-stripe operations (such as a read-dir in this example) may be implemented by passing the execution of the operation back and forth between threads owning the designated stripes. Of course, an alternative approach is to simply assign the read-dir request initially to a thread in FS-Exempt and, in the event a stripe boundary is encountered, to then re-assign the operation to FS-Main.

Another example of how the basic technique can be modified or extended relates to speculative read-ahead operations. In a storage server such as described above, speculative read-ahead can be performed when the file system thinks the client is reading according to a predictable pattern (e.g., a sequence of short read requests at sequential file offsets). In that event the file system attempts to improve efficiency by reading blocks from disk ahead of the next client request. Speculative read-aheads can span multiple file stripes, even though a single read request might fall cleanly into a stripe. Accordingly, while processing a read operation on one FS-Exempt thread, a read-ahead operation can be internally created and sent to the FS-Exempt thread which owns the next sequential file stripe. In one embodiment, the system attempts to keep read-aheads within the FS-Exempt domain and only switches to FS-Main when resources are not available. A read-ahead that stays within the same file stripe would be handled in the one corresponding thread in the FS-Exempt domain. However, when a read-ahead spans multiple file stripes, the portion of the read-ahead that crosses the stripe is split into a separate read-ahead operation. This separate read-ahead operation is then sent to the appropriate FS-Exempt thread stripe that handles that stripe This allows read-aheads to happen within the FS-Exempt domain without switching to FS-Main. Of course, modifications/extensions of the basic technique other than those described here are also possible.

Thus, a method and apparatus for increasing throughput in a storage server have been described. Note that the technique introduced here could alternatively be applied in a processing device other than a storage server. As just one example, this technique could easily be modified for implementation in a networking device (e.g., a switch, router or gateway). A network device's data plane can be executed in a parallelized domain similar to the FS-exempt domain described above, leaving the control plane in a non-parallelized domain similar to the FS-Main domain (i.e., creating an interlocked relationship between the "old" Network domain and a new Network--exempt domain). Instead of partitioning files into file stripes and assigning them to threads, the network device could partition network interfaces, for example, and could assign individual interfaces to threads, sending (for example) data packet processing to the Network-exempt domain, but leaving all other control operations in the Network domain.

Furthermore, the principles described above are not necessarily limited in application to a single (multi-processor) processing device. That is, it is possible to apply the principles described above to a distributed system, to facilitate two or more processing devices (e.g., two or more storage servers, each of which includes one or more processors) safely having access to the same data.

Software to implement the technique introduced here may be stored on a machine-readable medium. A "machine-accessible medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

"Logic", as is used herein, may include, for example, software, hardware and/or combinations of hardware and software.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
creating, by a storage server, a first domain for processes that are executable on a plurality of processors, the first domain comprising a plurality of threads that execute multiple processes in the first domain in parallel to service requests received by the storage server, wherein each of the plurality of threads in the first domain is operable to execute any of the multiple processes in the first domain;
logically dividing a data set managed by the processors into a plurality of subsets;
assigning each of the subsets of the data set to exactly one of the plurality of threads in the first domain, for processing of requests related to the data set in parallel, wherein each request processed by the first domain is directed to only one of the plurality of subsets; and
creating a second domain for processes other than the processes in the first domain, wherein only one process executes at a time in the second domain, wherein only the second domain is configured to process a received request directed to more than one of the plurality of subsets, wherein at least one of the processes in the first domain conflicts with one of the processes in the second domain, and wherein no process in the first domain is permitted to execute while any process in the second domain is executing and no process in the second domain is permitted to execute while any process in the first domain is executing.

2. A method as recited in claim 1, wherein while a thread in the first domain is executing a process in the first domain, one or more other threads in the first domain also execute said process.

3. A method as recited in claim 1, wherein the plurality of processors is implemented within the storage server.

4. A method as recited in claim 3, wherein the first domain and the second domain each include file system processes of the storage server.

5. A method as recited in claim 1, wherein the data set is a file.

6. A method as recited in claim 1, wherein said assigning is done according to a predetermined scheme for assigning subsets to the threads.

7. A method as recited in claim 1, wherein said assigning is done according to an assignment scheme which is determined dynamically according to a criterion evaluated during run-time.

8. A method as recited in claim 1, further comprising re-assigning one of the subsets of the data set to a different thread.

9. A method as recited in claim 1, further comprising:
receiving a request to perform an operation relating to the data set;
identifying a first subset of the data set, to which the operation relates;
assigning the operation to a first thread in the first domain, the first thread corresponding to the first subset of the data set;
determining that the operation also relates to a second subset of the data set; and
after execution of the operation has begun, and in response to said determining that the operation also relates to the second subset, transferring the operation to a second thread in the first domain, the second thread corresponding to the second subset.

10. A method as recited in claim 9, wherein the request to perform an operation is a request to read data from a directory.

11. A method as recited in claim 1, further comprising:
receiving a first read request initiated by a client system;
identifying a first subset of the data set as a target of the first read request;
assigning a read operation to a first thread in the first domain in response to the first read request, the first thread corresponding to the first subset of the data set; and
performing a read-ahead operation in response to the first read request by
automatically identifying a second subset of the data set as a target of an expected future read request, based on the first read request, and
assigning the read-ahead operation to a second thread in the first domain, the second thread corresponding to the second subset of the data set.

12. A method of operating a storage server that provides a set of clients with access to data stored in a storage subsystem, the method comprising:
creating, by the storage server, a first domain for file system processes that execute on a plurality of processors in the storage server, the first domain including file system processes operable to service read and write requests from the clients, the first domain being divided into a plurality of threads which concurrently execute, wherein each of the plurality of threads in the first domain is operable to execute any of the file system processes in the first domain;
logically dividing a file managed by the storage server into a plurality of stripes;
assigning each of the stripes of the file to exactly one of the plurality of threads of the first domain, the plurality of threads to process read and write requests directed to the file in parallel, wherein each of the requests is directed to only one of the plurality of stripes; and
creating a second domain for file system processes other than the file system processes in the first domain, wherein only one process executes at a time in the second domain, wherein only the second domain is configured to process a received request directed to more than one of the plurality of stripes, wherein at least one of the processes in the first domain conflicts with one of the processes in the second domain, and wherein no process in the first domain is permitted to execute while any process in the second domain is executing and no process in the second domain is permitted to execute while any process in the first domain is executing.

13. A method as recited in claim 12, wherein while a thread in the first domain is executing a process in the first domain, one or more other threads in the first domain also execute said process on separate data.

14. A method as recited in claim 12, wherein said assigning is done according to a predetermined scheme for assigning stripes to the threads.

15. A method as recited in claim 12, wherein said assigning is done according to an assignment scheme which is determined dynamically according to a criterion evaluated during run-time.

16. A method as recited in claim 12, further comprising re-assigning one of the stripes of the file to a different thread.

17. A method as recited in claim 12, further comprising:
performing said logically dividing the file and said assigning each of the stripes, for each of a plurality of different files stored in the storage subsystem.

18. A storage server comprising:
a plurality of processors;
a communication interface through which to communicate with a set of clients;
a storage interface through which to communicate with a storage subsystem containing data stored by the storage server on behalf of the clients; and
logic which causes the storage server to:
create a first domain for processes for servicing data access requests from the clients, the first domain being divided into a plurality of threads that execute concurrently on separate data, wherein each of the plurality of threads in the first domain can execute any of the processes in the first domain;
for each of a plurality of data sets stored by the storage server,
logically divide the data set into a plurality of subsets, and
assign each of the subsets to exactly one of the plurality of
threads in the first domain, for purposes of processing read and write requests directed to the data set in parallel, wherein each of the requests is directed to only one of the plurality of subsets; and
create a second domain for processes of the storage server other than the processes in the first domain, wherein only one process executes at a time in the second domain, wherein only the second domain is configured to process a received data access request directed to more than one of the plurality of subsets, wherein at least one of the processes in the first domain conflicts with one of the processes in the second domain, and wherein no process in the first domain is permitted to execute while any process in the second domain is executing and no process in the second domain is permitted to execute while any process in the first domain is executing.

19. A storage server as recited in claim 18, wherein while a thread in the first domain is executing a process in the first domain, one or more other threads in the first domain also execute said process.

20. A storage server as recited in claim 18, wherein the assigning of the subsets is done according to a predetermined scheme for assigning subsets to the threads.

21. A storage server as recited in claim 18, wherein the assigning of the subsets is done according to an assignment scheme which is determined dynamically according to a criterion evaluated during run-time.

22. A storage server as recited in claim 18, further comprising logic which, when executed, causes the storage server to re-assign one of the subsets of one of the data sets to a different thread.

23. A storage server as recited in claim 18, wherein the plurality of data sets includes a plurality of files.

24. A storage server as recited in claim 18, wherein the processes in the first and second domains are file system processes.

25. A storage server as recited in claim 18, further comprising logic which causes the storage server to:
- receive a request to perform an operation relating to a data set stored by the storage server;
- identify a first subset of the data set, to which the operation relates;
- assign the operation to a first thread in the first domain, the first thread corresponding to the first subset of the data set;
- determine that the operation also relates to a second subset of the data set; and
- after execution of the operation has begun, and in response to determining that the operation also relates to the second subset, transfer the operation to a second thread in the first domain, the second thread corresponding to the second subset.

26. A storage server as recited in claim 25, wherein the request to perform an operation is a request to read data from a directory.

27. A storage server as recited in claim 18, further comprising logic which causes the storage server to:
- receive a first read request initiated by a client of the storage server;
- identify a first subset of one of the data sets as a target of the first read request;
- assign a read operation to a first thread in the first domain in response to the first read request, the first thread corresponding to the first subset of the data set; and
- perform a read-ahead operation in response to the first read request by automatically identifying a second subset of one of the data sets as a target of an expected future read request, based on the first read request, and
- assigning the read-ahead operation to a second thread in the first domain, the second thread corresponding to the second subset of one of the data sets.

* * * * *